United States Patent
Hammons, Jr. et al.

(10) Patent No.: US 8,259,759 B2
(45) Date of Patent: Sep. 4, 2012

(54) SYSTEM AND METHOD FOR FRAME SYNCHRONIZATION

(75) Inventors: A. Roger Hammons, Jr., N. Potomac, MD (US); Frederic M. Davidson, Parkton, MD (US)

(73) Assignee: The Johns Hopkins University, Baltimore, MD (US)

( * ) Notice: Subject to any disclaimer, the term of this patent is extended or adjusted under 35 U.S.C. 154(b) by 318 days.

(21) Appl. No.: 12/759,329

(22) Filed: Apr. 13, 2010

(65) Prior Publication Data

US 2010/0260208 A1    Oct. 14, 2010

Related U.S. Application Data

(60) Provisional application No. 61/168,773, filed on Apr. 13, 2009.

(51) Int. Cl.
*H04J 3/06* (2006.01)
(52) U.S. Cl. .................................. 370/509; 370/350
(58) Field of Classification Search .............. 370/350, 370/503–514
See application file for complete search history.

(56) References Cited

U.S. PATENT DOCUMENTS

| | | | |
|---|---|---|---|
| 4,109,204 A | 8/1978 | Kincaid et al. | |
| 6,665,308 B1 * | 12/2003 | Rakib et al. | 370/441 |
| 6,671,325 B2 * | 12/2003 | Lee et al. | 375/259 |
| 7,023,833 B1 | 4/2006 | Aiello et al. | |
| 7,489,865 B2 | 2/2009 | Varshneya et al. | |
| 7,526,206 B1 | 4/2009 | Rolenz | |
| 7,593,648 B2 | 9/2009 | Raddatz | |
| 2003/0005385 A1 | 1/2003 | Stieger | |
| 2004/0166817 A1 | 8/2004 | Mokhtari et al. | |
| 2006/0067369 A1 | 3/2006 | Ballester et al. | |
| 2009/0116850 A1 | 5/2009 | Maryfield | |
| 2009/0175365 A1 | 7/2009 | Jun | |
| 2010/0182989 A1 * | 7/2010 | Ramesh et al. | 370/344 |

* cited by examiner

*Primary Examiner* — Phuc Tran
(74) *Attorney, Agent, or Firm* — Noah J. Hayward

(57) ABSTRACT

A system and method for calculating and applying a metric that is calculated over a binary interval that corresponds in length to a preamble. The value of the metric reflects the likelihood that the interval is the preamble. A lower value for the metric suggests that the interval is more likely to be the preamble. In an embodiment, the metric is calculated beginning at an initial location in the bitstream, and then recalculated beginning at each of several successive locations in the bitstream. This results in a set of calculated metrics. The start of the preamble is considered likely to be the initial location of the interval that corresponds to the metric having the lowest value.

26 Claims, 3 Drawing Sheets

SYSTEM AND METHOD FOR FRAME SYNCHRONIZATION

CROSS REFERENCE TO RELATED APPLICATIONS

This application is related to prior filed U.S. Provisional Application No. 61/168,773, filed on Apr. 13, 2009 which is incorporated herein by reference in its entirety.

STATEMENT OF GOVERNMENTAL INTEREST

This invention was made with U.S. Government support under the U.S. Air Force under contract number FA8650-04-D24130006. The U.S. Government has certain rights in the invention.

BACKGROUND OF THE INVENTION

1. Field of the Invention

The invention described herein relates to communications systems, and in particular relates to frame synchronization.

2. Description of Related Art

Free-space optical communications benefit from the advances in photonics that have enabled fiber-based optical systems to achieve a prominent role in wired backbone networks. Despite this success, however, physical layer and link layer protocols developed for fiber optics systems may not translate successfully to free-space optical applications.

This is seen in the frame synchronization process for packet communications over free-space optical links. Generally, a transmitter sends binary data to a receiver. The binary data is organized into frames of N bits. The receiver sees a continuous stream of bits and must determine the frame structure of the received data. In particular, the receiver needs to determine where each frame starts. This is required for a number of processes, including but not limited to forward error correction. The process of determining the starting point of frames is fundamental to frame synchronization.

One mechanism by which frame synchronization may be achieved involves the insertion of a known preamble into each frame. A transmitter may, for example, add a known preamble that is L bits long at the beginning of each frame. If the entire frame is N bits long, then the preamble will be followed by N−L data bits. The receiver must therefore find the preamble in each frame in order to determine the starting point of the frame. Finding the preamble is therefore required in order to attain frame synchronization.

This poses a processing problem for packet communications over a noisy channel as is the case for wireless radio and free space optical systems. The receiver must identify a bit pattern that matches the known preamble despite the fact that the received signal contains random user data and each bit signal may be corrupted by noise. Note that the communications receiver must compare the received noisy signal to a threshold in order to determine whether a 0 is present or a 1 is present. Such a determination may only be probabilistic in a noisy environment. The possibly noise-corrupted random user data further complicates the preamble identification because it might match or partially match parts of the preamble.

What is needed, therefore, is a system and method by which preamble identification may take place with a relatively high probability of accuracy by minimizing errors caused by noise or random user data.

BRIEF SUMMARY OF THE INVENTION

The system and method described herein applies a metric that is calculated in a sliding window of consecutive bits in the received data. The metric calculation examines all possible locations of the preamble within the data frame, each window consisting of a set of consecutive bit positions whose length is equal to that of the known preamble. The value of the metric reflects the likelihood that the window is the preamble. In certain embodiments of the invention, smaller values for the metric suggest that the window is more likely to be the preamble Thus, in such embodiments, the metric is calculated beginning at an initial location in the bitstream, and then recalculated beginning at each of several successive locations in the bitstream. The metric calculations are therefore performed starting at each of several successive initial locations. This results in a set of calculated metrics. The start of the preamble is considered to be the initial location of the interval that corresponds to the metric having the lowest value. The metric can therefore be viewed as a decision metric, in that its value enables a decision as to whether the window likely represents the preamble.

It should be noted, however, that transformations can be applied to a given decision metric to produce an equally useful new decision metric for which the decision rule might be the same (i.e., choose the window that generates the smallest value of the decision metric) or the opposite (i.e., choose the window that generates the largest value). For example, creating new metrics from old metrics by adding a constant or multiplying by a positive scalar will not change the frame start decisions. More generally, applying any increasing function to the metrics (e.g. logarithm) will not change the frame start decisions under the same minimum-value decision rule. On the other hand, creating new metrics by multiplying the original metric by −1 requires that the decisions be made instead based on the maximum, rather than minimum, value of the new metrics. In general, applying any decreasing function of the original (minimum-value decision rule) metrics yields equally useful new metrics for which the maximum-value decision rule produces the same frame start decisions. The choice of specific transformations to apply to a given set of metrics is a matter of convenience or preference. For reasons of brevity and clarity, the invention will be presented in terms embodiments of the decision metrics. Transformations of the metrics described below represent additional embodiments of the invention.

The system and method described herein may be applied in a frame-based communications system that operates in a noisy environment. One example of such a system is a free-space optical system using on-off keying (OOK) modulation that is detected via an optically amplified p-i-n photodiode receiver. For such systems, the channel is a quasi-static fading channel with additive white Gaussian noise having the property that the noise variance is higher for a received 1 than for a received 0. Channel fading may be due to atmospheric turbulence and may be a slowly-changing stochastic process with time constants on the order of milliseconds or longer. As the turbulence becomes more severe, signal fades may become deep and persistent. The synchronization process and system described herein presumes the prepending of the data payload with a unique word sequence or preamble that identifies the start of a frame. The preamble and packet durations are usually much smaller than the coherence time of the channel, so that as far as frame synchronization is concerned, the channel may be modeled as an additive white Gaussian noise channel with signal-dependent noise variance. Should the coherence time of the channel be comparable to or smaller than the frame duration, so that the fading causes significant amplitude distortion in the received signal associated with the bit stream, the distortion could be estimated and corrected prior to or as part of the frame synchronization function.

BRIEF DESCRIPTION OF THE DRAWINGS/FIGURES

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

The description that follows presents the invention in the context of a free-space optical (FSO) packet communications system. This is not meant to limit the applicability of the invention. Embodiments of the invention may be implemented in a variety of frame-based digital communications systems where noise may be an issue.

In a FSO transceiver system, a direct detection optical receiver may be used, containing an optical pre-amplifier and p-i-n photodiode photodetector that is AC-coupled to a transimpedance current amplifier (TIA). The modulation format may be on-off keying (OOK) with equally likely signals. Individual received bit decisions are made by comparing signal levels, output by the TIA, to a threshold that may be fixed at a constant (often set to zero for low-cost receivers) or an optimal threshold which depends on received signal levels.

Figure 1:
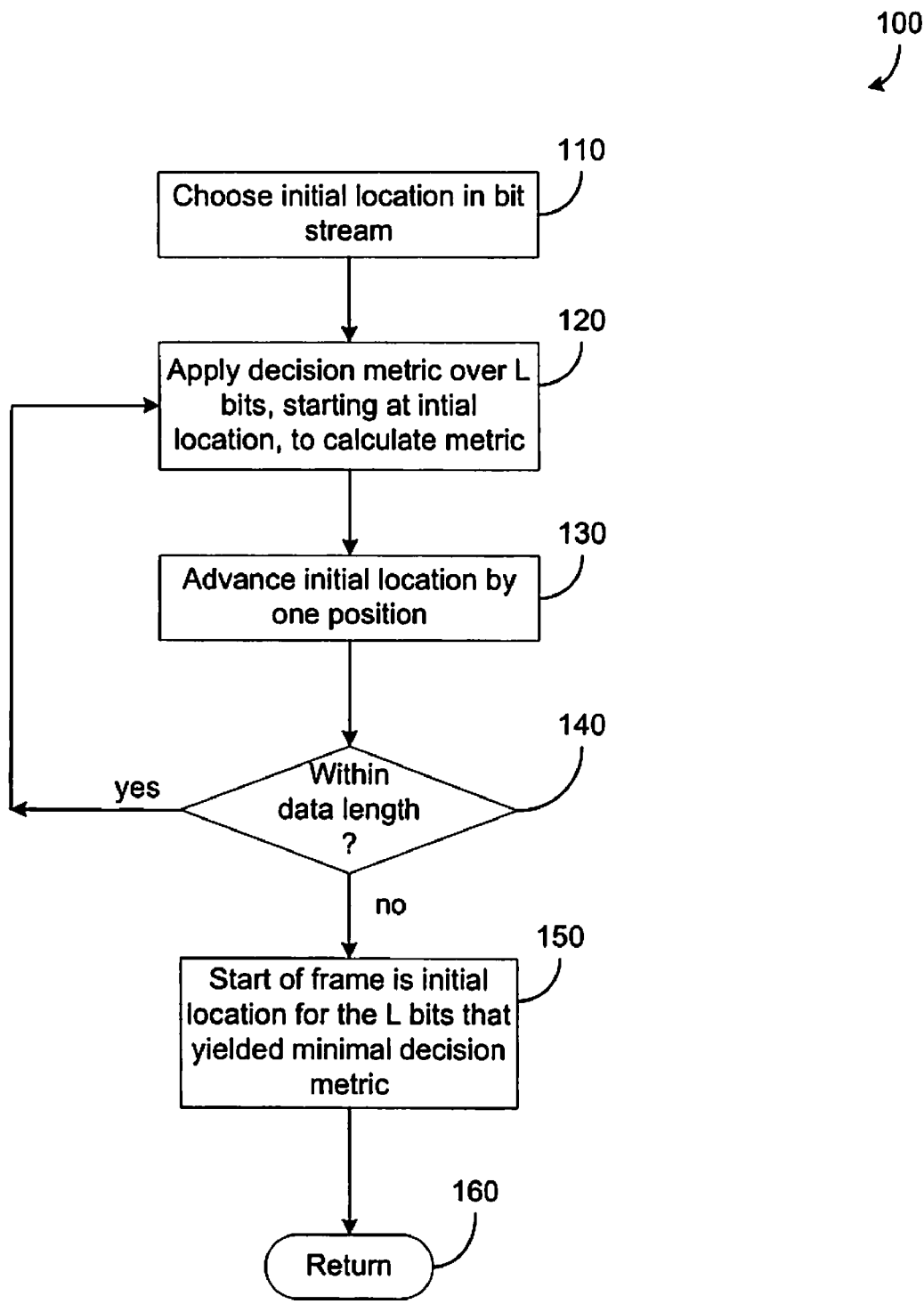
FIG. 1 is a flowchart illustrating processing of the invention, according to an embodiment.

The overall processing of the invention is illustrated in FIG. 1, according to an embodiment. At 110, an initial location in the received bitstream is chosen. At 120, the decision metric is calculated beginning at the chosen initial location. The metric is calculated as a function of L consecutive bits, where L is equal to the length of the preamble. In an embodiment, L may be equal to 32 bits for example.

The decision metric may take any of several forms. Generally, the decision metric includes a first term indicative of the difference between the signal levels of the received detected bits and the corresponding bit signal levels expected if the preamble were present at position μ, and a second term indicative of the difference between the signal levels of the received detected bits and the corresponding bit signal levels expected for the received detected bits. The first and second terms are dependent on noise variances associated with the expected signal levels.

The decision metric $S(\mu)$ is defined as follows in an embodiment of the invention:

$$S(\mu) = \sum_{\substack{0 \leq i < L \\ s_i \neq \rho_{\mu+i,HD}}} \left( \frac{\rho_{\mu+i} - As_i}{\sigma_{s_i}} \right)^2 - \sum_{\substack{0 \leq i < L \\ s_i \neq \rho_{\mu+i,HD}}} \left( \frac{\rho_{\mu+i} - A\rho_{\mu+i,HD}}{\sigma_{\rho_{\mu+i,HD}}} \right)^2 + \sum_{\substack{0 \leq i < L \\ s_i \neq \rho_{\mu+i,HD}}} \log\left( \frac{\sigma_{s_i}}{\sigma_{\rho_{\mu+i,HD}}} \right)^2.$$

In this expression,

L=length of the preamble, i is a bit index, $\rho_{\mu+i}$=signal level (referred to herein as a soft decision value) of received detected bit at position μ+i, $\rho_{\mu+i, HD}$=binary value (referred to herein as a hard decision value) produced by bit detector for received detected bit at position μ+i, $s_i = i^{th}$ bit of the preamble, equal to 0 or 1, A=amplitude corresponding to the difference between the expected signal level of a received detected bit of binary value 1 and the expected signal level of a received detected bit of binary value 0, and σ=standard deviation of noise associated with a received detected bit having binary value equal to the subscript of this variable.

As would be understood by a person of ordinary skill in the art, in other embodiments of the invention, various transformations of the above decision metric may be used instead, as noted above.

Returning to FIG. 1, at 130 the initial location is advanced by one position. At 140, a determination is made as to whether this new initial location is within a distance or data length of the originally chosen initial location. This data length may be equal to the size N of a frame. If so then the process continues at 120, where another decision metric is calculated for the L consecutive bits starting at the new initial location that was identified at 130. In an embodiment, N may be equal to 512 bits, for example. The process iterates through 120-140, with a new decision metric generated each time. Each new decision metric is therefore calculated based on an L-long window of bits, where the window advances by one position after each calculation. The next metric calculation is then based on the L bits in the new window.

If, at 140, the new initial location is now N bits away from the originally chosen initial location, then the process continues at 150. Here, the likely start of the preamble (and the start of the frame) is identified as the initial location for the L consecutive bits that yield the minimal decision metric. The process may conclude at 160.

As noted above, in alternative embodiments, the decision metric may be restated as a function where the maximal decision metric is used to identify the likely start of the preamble. In either case, it is an extremal value of the decision metric that is used to identify the start of the preamble.

In some embodiments, it may be appropriate to restate the above metric calculation by applying one or more assumptions. The above decision metric requires knowledge of the average signal level and signal-dependent noise variances as well as soft information (analog values) from the bit detector. In a practical implementation, the average signal level and noise variances could be estimated directly from average optical power measurements for a calibrated receiver, and the detector output could be quantized by analog-to-digital (A/D) conversion with negligible loss if the number of bits in the A/D converter is not small.

Typically, however, the detectors used in FSO receivers for OOK modulation provide only one bit of precision—that is, hard-decision estimates. Under this restriction, the frame synchronization decision metric can be further simplified, leading to a "weighted disagreements" version of the decision rule that is more amenable to high-speed implementation but requires higher signal-to-noise ratio to achieve reliable frame synchronization.

Specifically, when $\rho_{\mu+i}$ is replaced by its ideal hard-decision counterpart value $A\rho_{\mu+1,HD}$, the metric reduces to a hard-decision form, $$\sum_{\substack{0 \leq i < L \\ s_i \neq \rho_{\mu+i,HD}}} \left[\frac{A^2}{\sigma_{s_i}^2} + \log\left(\frac{\sigma_{s_i}}{\sigma_{\rho_{\mu+i,HD}}}\right)^2\right].$$

Moreover, if signal-dependent noise variance is ignored, then $\sigma$ is constant and the metric becomes the number of the discrepancies between the received hard-decision bits and the corresponding unique word bits:

$$\sum_{i=0}^{L-1} s_i \oplus \rho_{\mu+i,HD},$$

where $\oplus$ represents modulo 2 addition.

The decision metric may be calculated using digital logic in the form of software, firmware, or hardware, or some combination thereof. A hardware implementation may take the form of one or more field programmable gate arrays (FPGAs). Alternatively, a hardware implementation may take the form of one or more application specific integrated circuits (ASICs).

Figure 2:
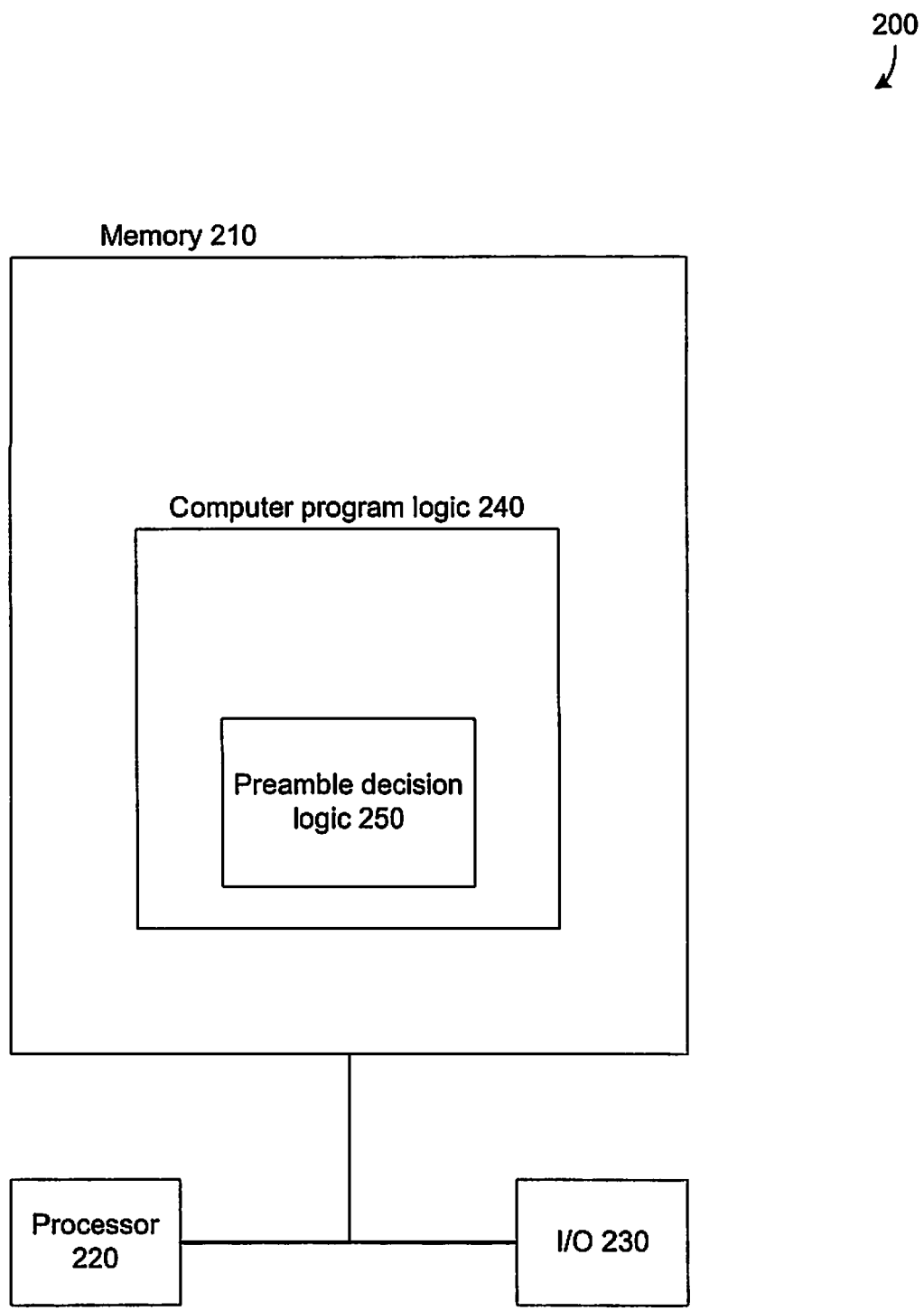
FIG. 2 is a block diagram illustrating the context in which the invention may operate, according to an embodiment.

The term software, as used herein, refers to a computer program product including a computer readable medium having computer program logic stored therein to cause a computer system to perform one or more features and/or combinations of features disclosed herein. A software embodiment is illustrated in the context of a computing system 200 in FIG. 2. System 200 may include a processor 220 and a body of memory 210 that may include one or more computer readable media that may store computer program logic 240. Memory 210 may be implemented as a read-only memory (ROM) device, for example. Processor 220 and memory 210 may be in communication using any of several technologies known to one of ordinary skill in the art, such as a bus. Computer program logic 240 is contained in memory 210 and may be read and executed by processor 220. One or more I/O ports and/or I/O devices, shown collectively as I/O 230, may also be connected to processor 220 and memory 210.

Computer program logic 240 includes preamble decision logic 250. In the illustrated embodiment, preamble decision logic 250 calculates the decision metric described above, where the metric is calculated starting at each of L successive initial locations in a received binary stream. Moreover, preamble decision logic 250 uses the calculated decision metric values to determine the likely beginning of a preamble in a frame. As would be known to a person of ordinary skill in the art, decision logic 250 may be implemented using any of a variety of computer programming languages such as, for example and without limitation, C, C++, or assembly language.

One embodiment of preamble decision logic 250 using the C programming language is as follows:

```
min_framesync = sync_length;
for (loc=0; loc<data_length; ++loc) {
    framesync_errors = 0;
    for (i=0; i<sync_length; ++i) {
        if (hard_decision[loc+i] != sync_pattern[i])
            ++framesync_errors;
    }
    if (framesync_errors < min_framesync_errors) {
        min_framesync_errors = framesync_errors;
        estimated_framesync_loc = loc;
    }
} // End loop over potential frame starts
return (estimated_framesync_loc);
```

An alternative embodiment of preamble decision logic 250 using the C programming language is as follows:

```
min_framesync_sum = sync_length;
for (loc=0; loc<data_length; ++loc) {
    framesync_sum = 0;
    for (i=0; i<sync_length; ++i) {
        framesync_sum += (hard_decision[loc+i] +
            sync_pattern[i]%2;
    }
    if (framesync_sum < min_framesync_sum) {
        min_framesync_sum = framesync_sum;
        estimated_framesync_loc = loc;
    }
} // End loop over potential frame starts
return (estimated_framesync_loc);
```

Figure 3:
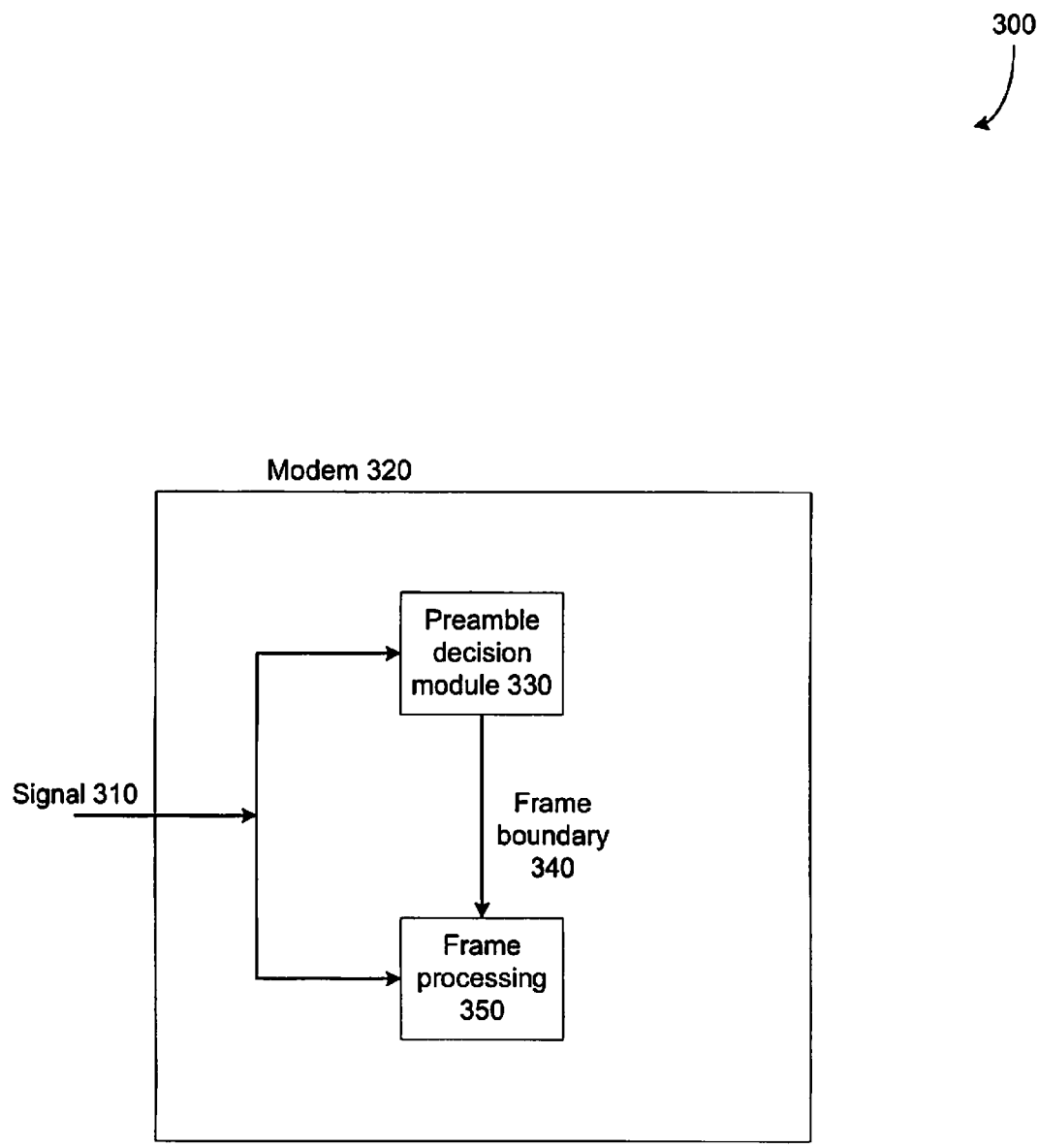
FIG. 3 is a block diagram illustrating the computing context of a software or firmware embodiment of the invention.

The logic for implementing the decision metric calculation and determining the location of a preamble in a frame may be incorporated in a communications component such as a modem. This is illustrated in FIG. 3, according to an embodiment. A binary signal 310 is received at a modem 320. In the illustrated embodiment, signal 310 is passed to a preamble decision module 330. At preamble decision module 330, the decision metric described above may be calculated and the likely beginning of the preamble, i.e., the frame boundary, may be determined. This point in the signal 310 represents the boundary of a frame. This information is shown as frame boundary 340 in the embodiment of FIG. 3. The frame boundary 340 is then used in additional frame processing of signal 310; logic for performing such additional frame processing is show generically as frame processing module 350.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method of performing frame synchronization, comprising:
receiving a binary stream comprising a plurality of N-bit frames; and
starting at an initial location $\mu$ in the binary stream, detecting a preamble of length L in the binary stream by calculating a decision metric $S(\mu)$, the decision metric computed over the bit positions within the interval $\mu$ and $\mu+L-1$ and consisting of a plurality of terms, including a first term indicative of the difference between the signal levels of the received detected bits and the corresponding bit signal levels expected if the preamble were present at position $\mu$, a second term indicative of the difference between the signal levels of the received detected bits and the corresponding bit signal levels expected for the received detected bits, wherein the first and second terms are dependent on noise variances associated with the expected signal levels,
wherein said receiving and detecting are performed on one or more digital logic devices.

2. The method of claim 1, wherein the decision metric is calculated in a sliding window at each of N-L consecutive bit locations and a bit location whose computed decision metric is extremal, having one of a minimum or maximum value among the N-L consecutive bit locations tested, is identified as the start of the preamble.

3. The method of claim 2, wherein the decision metric $S(\mu)$ for starting bit location $\mu$ is calculated as a function that is an increasing function of $$M(\mu) = \sum_{\substack{0 \leq i < L \\ s_i \neq \rho_{\mu+i,HD}}} \left(\frac{\rho_{\mu+i} - As_i}{\sigma_{s_i}}\right)^2 - \sum_{\substack{0 \leq i < L \\ s_i \neq \rho_{\mu+i,HD}}} \left(\frac{\rho_{\mu+i} - A\rho_{\mu+i,HD}}{\sigma_{\rho_{\mu+i,HD}}}\right)^2 + \sum_{\substack{0 \leq i < L \\ s_i \neq \rho_{\mu+i,HD}}} \log\left(\frac{\sigma_{s_i}}{\sigma_{\rho_{\mu+i,HD}}}\right)^2$$

where
is a bit index,
$\rho_{\mu+i}$=signal level of received detected bit at position $\mu+i$,
$\rho_{\mu+i,HD}$=binary value produced by bit detector for received detected bit at position $\mu+i$,
$s_i$=ith bit of the preamble equal to 0 or 1,
A=amplitude corresponding to difference between the expected signal level of a received detected bit of binary value 1 and the expected signal level of a received detected bit of binary value 0, and
$\sigma$=standard deviation of noise associated with a received detected bit having a binary value equal to the subscript of this variable.

4. The method of claim 3, wherein the initial location at which a minimal value of the decision metric is calculated is identified as the start of the preamble of a frame.

5. The method of claim 4, wherein each soft decision value $\rho_{\mu+i}$ is approximated by the expected signal level $A_{\rho_{\mu+i,HD}}$ associated with the corresponding binary hard decision value.

6. The method of claim 4, wherein noise variances $\sigma^2$ are approximated as being equal to a constant, the constant being the same whether the received detected bit is a 1 or a 0.

7. The method of claim 2, wherein the decision metric $S(\mu)$ for starting bit location $\mu$ is calculated as a function that is an decreasing function of $$M(\mu) = \sum_{\substack{0 \leq i < L \\ s_i \neq \rho_{\mu+i,HD}}} \left(\frac{\rho_{\mu+i} - As_i}{\sigma_{s_i}}\right)^2 - \sum_{\substack{0 \leq i < L \\ s_i \neq \rho_{\mu+i,HD}}} \left(\frac{\rho_{\mu+i} - A\rho_{\mu+i,HD}}{\sigma_{\rho_{\mu+i,HD}}}\right)^2 + \sum_{\substack{0 \leq i < L \\ s_i \neq \rho_{\mu+i,HD}}} \log\left(\frac{\sigma_{s_i}}{\sigma_{\rho_{\mu+i,HD}}}\right)^2$$

where
is a bit index,
$\rho_{\mu+i}$=signal level of received detected bit at position $\mu+i$,
$\rho_{\mu+i,HD}$=binary value produced by bit detector for received detected bit at position $\mu+i$,
$s_i$=ith bit of the preamble, equal to 0 or 1,
A=amplitude corresponding to difference between the expected signal level of a received detected bit of binary value 1 and the expected signal level of a received detected bit of binary value 0,
$\sigma$=standard deviation of noise associated with a received detected bit having binary value equal to the subscript of this variable.

8. The method of claim 7, wherein the initial location at which a maximal value of the decision metric is calculated is declared to be the start of the preamble of a frame.

9. The method of claim 2, wherein the decision metric $$S(\mu) = \sum_{i=0}^{L-1} s_i \oplus \rho_{\mu+i,HD},$$

where
$\rho_{\mu+i,HD}$=binary value produced by bit detector for received detected bit at position $\mu+i$,
and
$s_i$=ith bit of the preamble equal to 0 or 1.

10. The method of claim 9, wherein the initial location at which a minimal value of the decision metric is calculated is declared to be the start of the preamble of a frame.

11. The method of claim 2, wherein the decision metric $S(\mu)$ for starting bit location $\mu$ is calculated as a function that is a decreasing function of $$M(\mu) = \sum_{i=0}^{L-1} s_i \oplus \rho_{\mu+i,HD},$$

where
$\rho_{\mu+i,HD}$=binary value produced by bit detector for received detected bit at position $\mu+i$,
and
$s_i$=ith bit of the preamble equal to 0 or 1.

12. The method of claim 11, wherein the initial location at which a maximal value of the decision metric is calculated is declared to be the start of the preamble of the frame.

13. A non-transitory computer readable medium including a computer readable program code having computer program logic stored thereon for causing a processor to perform frame synchronization, the computer program logic comprising:

logic configured to cause the processor to start at an initial location µ in a received binary stream, and detect a preamble of length L in the binary stream by calculating a decision metric S(µ), the decision metric computed over the bit positions within the interval µ and µ+L−1 and consisting of a plurality of terms, including a first term indicative of the difference between the signal levels of the received detected bits and the corresponding bit signal levels expected if the preamble were present at position p, a second term indicative of the difference between the signal levels of the received detected bits and the corresponding bit signal levels expected for the received detected bits, wherein the first and second terms are dependent on noise variances associated with the expected signal levels.

14. The non-transitory computer readable medium of claim 13, wherein the decision metric is calculated in a sliding window at each of N-L consecutive bit locations and a bit location whose computed decision metric is extremal, having one of a minimum or maximum value among the N-L consecutive bit locations tested, is identified as the start of the preamble.

15. A system for performing frame processing, comprising:

a preamble decision module configured to receive a binary stream comprising a plurality of N-bit frames; and starting at an initial location µ in the binary stream, detect a preamble of length L in the binary stream by calculating a decision metric S(µ), the decision metric computed over the bit positions within the interval µ and µ+L−1 and consisting of a plurality of terms, including a first term indicative of the difference between the signal levels of the received detected bits and the corresponding bit signal levels expected if the preamble were present at position a second term indicative of the difference between the signal levels of the received detected bits and the corresponding bit signal levels expected for the received detected bits, wherein the first and second terms are dependent on noise variances associated with the expected signal levels.

16. The system of claim 15, wherein the decision metric is calculated in a sliding window at each of N-L consecutive bit locations and a bit location whose computed decision metric is extremal, having one of a minimum or maximum value among the N-L consecutive bit locations tested, is identified as the start of the preamble.

17. The system of claim 16, wherein the decision metric S(µ) for starting bit location µ is calculated as a function that is an increasing function of $$M(\mu) = \sum_{\substack{0 \le i < L \\ s_i \ne \rho_{\mu+i,HD}}} \left( \frac{\rho_{\mu+i} - A s_i}{\sigma_{s_i}} \right)^2 -$$

-continued $$\sum_{\substack{0 \le i < L \\ s_i \ne \rho_{\mu+i,HD}}} \left( \frac{\rho_{\mu+i} - A\rho_{\mu+i,HD}}{\sigma_{\rho_{\mu+i,HD}}} \right)^2 + \sum_{\substack{0 \le i < L \\ s_i \ne \rho_{\mu+i,HD}}} \log\left( \frac{\sigma_{s_i}}{\sigma_{\rho_{\mu+i,HD}}} \right)^2$$

where i is a bit index, $\rho_{\mu+i}$=signal level of received detected bit at position $\rho_{\mu+i,HD}$=binary value produced by bit detector for received detected bit at position µ+i, $s_i$=ith bit of the preamble equal to 0 or 1, A=amplitude corresponding to difference between the expected signal level of a received detected bit of binary value 1 and the expected signal level of a received detected bit of binary value 0, σ=standard deviation of noise associated with a received detected bit having a binary value equal to the subscript of this variable.

18. The system of claim 17, wherein the initial location at which a minimal value of the decision metric is calculated is identified as the start of the preamble of a frame.

19. The system of claim 18, wherein each soft decision value $\rho_{\mu+i}$ is approximated by the expected signal level $A\rho_{\mu+i,HD}$ associated with the corresponding binary hard decision value.

20. The system of claim 18, wherein noise variances $\sigma^2$ are approximated as being equal to a constant, said constant being the same whether the received detected bit is a 1 or a 0.

21. The system of claim 16, wherein the decision metric S(µ) for starting bit location µ is calculated as a function that is an decreasing function of $$M(\mu) = \sum_{\substack{0 \le i < L \\ s_i \ne \rho_{\mu+i,HD}}} \left( \frac{\rho_{\mu+i} - A s_i}{\sigma_{s_i}} \right)^2 -$$

$$\sum_{\substack{0 \le i < L \\ s_i \ne \rho_{\mu+i,HD}}} \left( \frac{\rho_{\mu+i} - A\rho_{\mu+i,HD}}{\sigma_{\rho_{\mu+i,HD}}} \right)^2 + \sum_{\substack{0 \le i < L \\ s_i \ne \rho_{\mu+i,HD}}} \log\left( \frac{\sigma_{s_i}}{\sigma_{\rho_{\mu+i,HD}}} \right)^2$$

where is a bit index, $\rho_{\mu+i}$=signal level of received detected bit at position µ+i, $\rho_{\mu+i,HD}$=binary value produced by bit detector for received detected bit at position µ+i, $s_i$=ith bit of the preamble, equal to 0 or 1, A=amplitude corresponding to difference between the expected signal level of a received detected bit of binary value 1 and the expected signal level of a received detected bit of binary value 0, σ=standard deviation of noise associated with a received detected bit having binary value equal to the subscript of this variable.

22. The system of claim 21, wherein the initial location at which a maximal value of the decision metric is calculated is identified as the start of the preamble of the frame.

23. The system of claim 16, wherein the decision metric $$S(\mu) = \sum_{i=0}^{L-1} s_i \oplus \rho_{\mu+i,HD},$$

where $\rho_{\mu+i,HD}$=binary value produced by bit detector for received detected bit at position $\mu+i$, and $s_i$=ith bit of the preamble equal to 0 or 1.

24. The system of claim 23, wherein the initial location at which a minimal value of the decision metric is calculated is identified as the start of the preamble of a frame.

25. The system of claim 16, wherein the decision metric $S(\mu)$ for starting bit location $\mu$ is calculated as a function that is a decreasing function of $$M(\mu) = \sum_{i=0}^{L-1} s_i \oplus \rho_{\mu+i,HD},$$

where $\rho_{\mu+i,HD}$=binary value produced by bit detector for received detected bit at position $\mu+i$, and $s_i$=ith bit of the preamble equal to 0 or 1.

26. The system of claim 25, wherein the initial location at which a maximal value of the decision metric is calculated is declared to be the start of the preamble of a frame.

* * * * *